Aug. 27, 1968     W. B. CAMPBELL ET AL     3,398,535
ENGINE SUPPORTING STRUCTURE
Filed May 25, 1966                    2 Sheets-Sheet 1
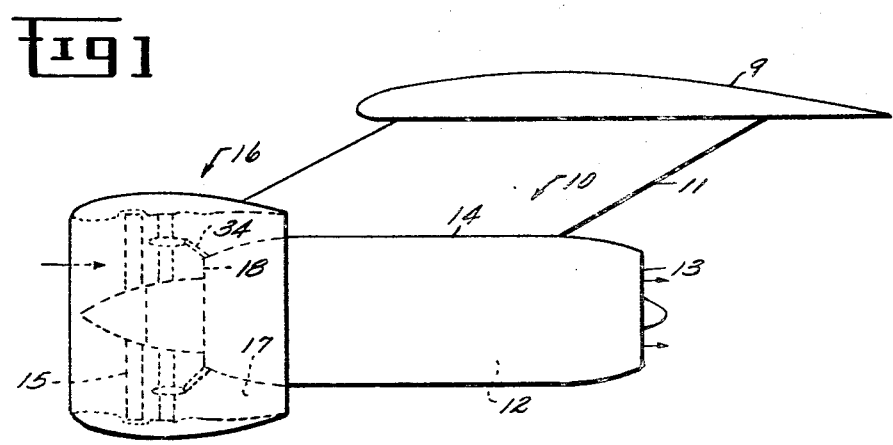
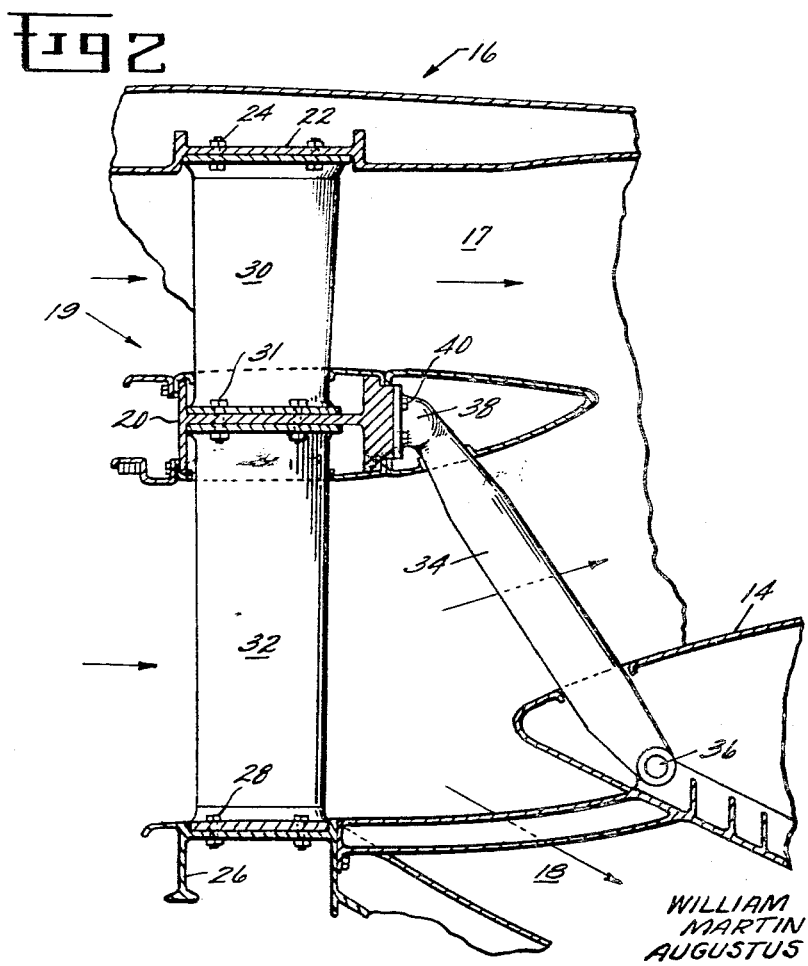
INVENTORS
WILLIAM B. CAMPBELL
MARTIN C. HEMSWORTH
AUGUSTUS M. HELMINTOLLER
BY
John F. Cullen
ATTORNEY

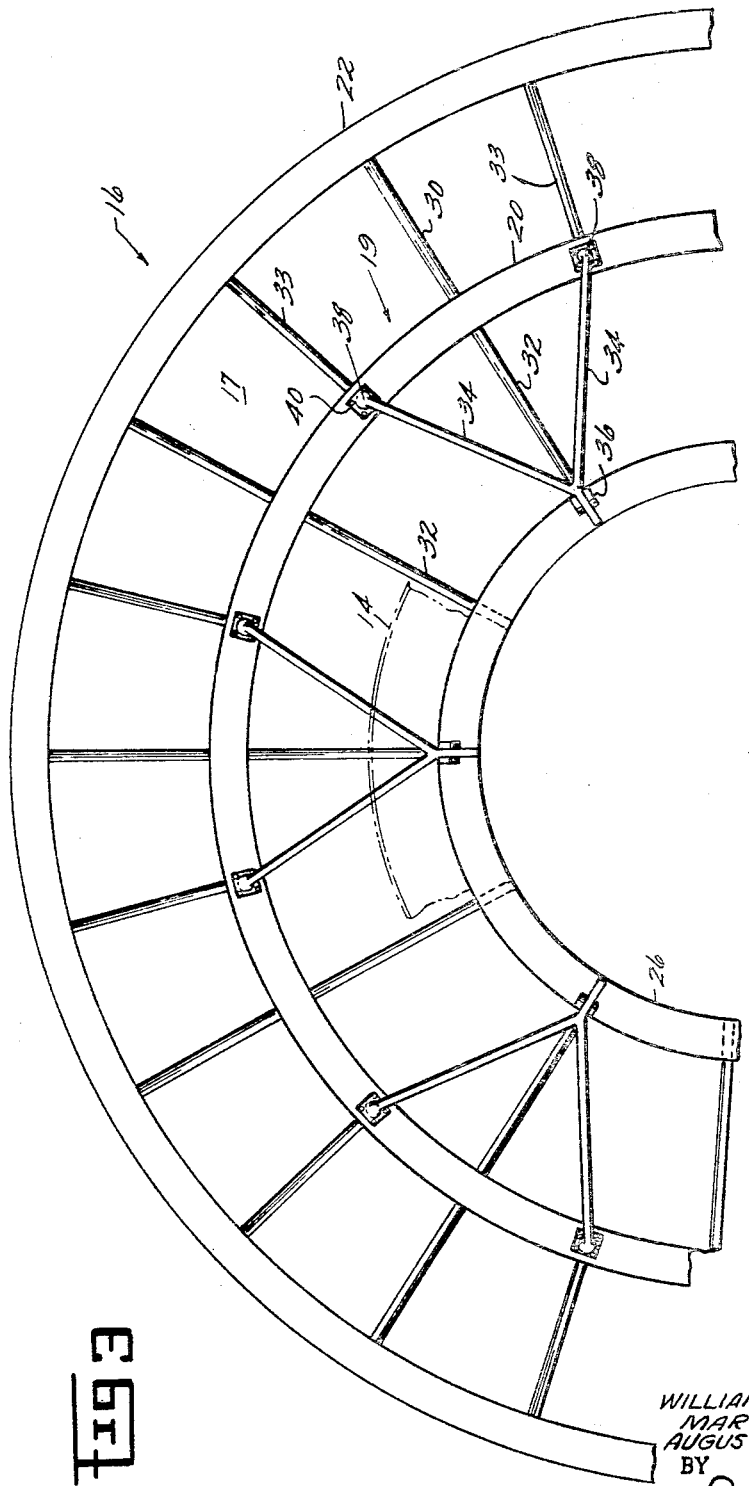

United States Patent Office 3,398,535
Patented Aug. 27, 1968

3,398,535
ENGINE SUPPORTING STRUCTURE
William B. Campbell and Martin Carl Hemsworth, Cincinnati, and Augustus M. Helmintoller, Loveland, Ohio, assignors to General Electric Company, a corporation of New York
Filed May 25, 1966, Ser. No. 552,755
6 Claims. (Cl. 60—226)

ABSTRACT OF THE DISCLOSURE

A supporting structure for the cowling of the fan portion of a turbofan propulsion power plant transmits loads from the fan to a core engine portion through V-struts connected to a ring-like member disposed within the cowling between inner and outer strut stator vane portions and connected to a wall of the core engine.

The present invention relates to engine supporting structure and, more particularly, to a supporting and load transmitting structure for the cowling of turbofan engines of the high bypass ratio type.

In present day turbojet engines or turbofan engines of the high bypass ratio type, the weight flow of air through the engines becomes quite large in order to provide the thrust necessary. In the bypass turbofan engines wherein thrust reverser structure is required in the outer cowling, the loads that must be transmitted through the cowling become very large in addition to the normal loads that are created by the effect of the cowling itself acting as a large airfoil. Generally, to strengthen the structure in large turbofans it has become necessary to provide a ring or annulus near the mid-span of the fan stator blading. Because the cowling has large axial, radial, and moment loads, some structure must be provided to transmit the loads to the inner core engine without unduly increasing the engine weight. It has been customary to use the guide vanes as structural members thus doing away with unnecessary additional linkage struts in order to transmit the cowling load to the inner core engine. Additionally, various V-struts have been used in one form or another in order to provide structure for load transmission. Finally, it is known to provide detachable connections so that various parts may be easily replaced.

Generally, the structures to date have been confined to smaller diameter engines which have not been subjected to the heavy loads of present day engines. For example, a large turbofan engine may have an outer cowling diameter of 8 to 10 feet and inside this cowling a large fan rotates. It is easy to see that the gyroscopic and axial and radical loads on such structure become extremely large when it is realized that the cowling itself acts as a large barrel-like airfoil and in addition may house thrust reverser mechanism which, in turn, imposes heavy loads on the cowling. An engine of this general type is shown in application Ser. No. 476,100, filed July 30, 1965, and of common assignment.

The main object of the present invention is to provide a particular supporting and load transmitting structure for the cowling of large turbofan engines by which the loads may be efficiently transmitted to the inner core engine without unnecessary duplication of parts.

A further object is to provide such a structure which uses vanes to perform the dual function of outlet guide vanes as well as structural members and thus avoid duplication of parts while at the same time making these structural members detachable for easy replacement and maintainability.

A further object is to provide such a structure wherein the mid-ring acts in conjunction with the stator vanes to react and transmit the various loads from the cowling in a manner that provides a substantially rigid structure.

Another object is to provide such a structure which utilizes radial vanes and slanted V-strut members in an efficient manner to transmit loads in three directions to the inner core engine.

Briefly stated, the invention is directed to a supporting and load transmitting structure for use in a jet propulsion powerplant of the fan type which has an inner wall surrounding a core engine and a fan concentric therewith to extend radially beyond the wall. A cowling surrounds the fan and is spaced from the wall to define a bypass duct. The inner core gas generator or jet engine means has an annular entrance from the duct. The transmitting load structure comprises a ring like member that may be a mid-ring and is disposed concentrically in the duct. A first plurality of strut stator vanes is connected to the cowling and to the ring member and a second plurality of strut stator vanes is connected to the ring member and the wall radially inward of the first vanes. A third plurality of V-struts is connected to the ring downstream of the vanes and slants downstream to the wall and the V-struts are particularly arranged to have their apexes connected to the wall and their opposite or free ends are peripherally spaced upstream of the apexes and around the ring in radial alignment with struts of the first plurality so that the cowling loads are split through the struts to the inner engine wall. The first and second pluralities of struts may be disposed radially across the duct and may be equal or unequal in number. Additionally, the ring-like member is preferably an I-beam with its web extending axially to provide a large section modulus for minimum deflection under axial, radial and torsional loads. Further, the V-struts may have a pivotal connection on at least one end thereof to avoid the transmission of moment loads.

While the specification concludes with claims particularly pointing out and distinctly claiming the subject matter which is regarded as the invention, it is believed the invention will be better understood from the following description taken in connection with the accompanying drawing in which:

FIGURE 1 is a plan view of a typical front fan powerplant supported from an aircraft wing and employing the instant invention;

FIGURE 2 is a partial cross-sectional view of the load transmitting structure and, FIGURE 3 is a view on a reduced scale looking in on the end of FIGURE 2.

Referring first to FIGURE 1, there is shown a front fan powerplant of the general type that might employ the instant invention. To this end an aircraft structure such as wing 9 may support an engine generally indicated at 10 by means of a conventional strut or pylon structure 11. Engine 10 may be of the front fan concentric type as shown in FIGURE 1 which employs an inner core or jet engine 12 discharging through a nozzle 13 to provide thrust. The jet engine is enclosed within an inner wall 14 in the conventional manner. While described in connection with a concentric fan jet engine, it should be noted that wall 14 may be the wall of a plug in a pure cruise fan fed from a remote gas generator in a well-known manner. For convenience of description the concentric arrangement will be described. In order to provide additional thrust in the well-known manner, a fan 15 concentric with the engine and extending radially beyond the wall 14 is provided. The fan 15 is surrounded by a casing or cowling 16 which is larger in diameter than the engine and spaced from the engine inner wall 14 to form a bypass duct 17 for additional thrust by movement of relatively large masses of lower velocity air in the well-known manner. In the high bypass ratio type powerplant this mass of air may be as high as five times or greater the amount of airflow through the engine 12. The fan air is thus used to propel fluid through duct 17 as well as to supercharge the engine 12 which receives its air supply through an annual entrance 18 from duct 17.

Generally, cowling 16 is subject to very high loads in all three directions. Additionally, cowling 16 may be designed to carry thrust reversing mechanism by which the flow through duct 17 is reversed to create very large moments or shear loads or both on the cowling which must be transmitted to inner wall 14 of the core engine.

Referring next to FIGURE 2, an engine of the general type described requires outlet guide vanes downstream of fan 15 and these are made as strut members or strut stator vanes generally indicated at 19 which are designed to connect cowling 16 with inner wall 14 for transmission of part of the loads imposed on the cowling. These vanes 19 may be slanted or preferably are disposed radially as shown in FIGURE 2. Because of the large diameters and the large mass flow of air, it is necessary to provide a ring-like member 20 between the ends of stator vanes 19. Preferably, ring member 20 is provided substantially at the mid-span of the stator vanes or slightly beyond as shown in FIGURE 2. These vanes 19 are formed in a well-known airfoil shape and are strong enough to act as both outlet guide vanes downstream of fan 15 to straighten out the flow and act as strut members for transmission of the cowling loads. The ring member 20 is preferably in the form of a continuous I-beam as shown with its web extending axially in the duct to provide large section properties with a minimum of deflection or twisting.

In order to replace any damaged parts and to provide for easy maintainability, the stator vanes 19 are secured to the cowling by means of an outer ring 22, the vanes being detachably connected thereto by any suitable means such as bolts 24. Similar attachment is provided by inner ring 26 and suitable bolting means 28. Further, the use of the web of the I-beam, in addition to providing the large section modulus in the desired direction provides a convenient means for splitting the stator vanes 19 into a first plurality of connected outer stator vanes 30 detachably connected to the cowling as noted and a second plurality of inner strut stator vanes 32 connected to the inner wall 14 as noted. The web forms a platform for detachably connecting the other ends of both vanes by bolts 31. As seen in FIGURE 3, the numbers of stator vanes in the first plurality of vanes 30 may or may not be equal in number to the second plurality of inner vanes 32. Preferably, each strut vane of the second plurality extends in radial alignment with each strut vane of the first plurality as shown in FIGURE 3 to avoid moments on the ring. One or more short intermediate strut vanes 33 may be provided between the aligned strut vanes as shown in FIGURE 3.

In order to transmit some of the axial loading to the inner wall there is provided with this strut vane structure a novel V-strut arrangement generally indicated at 34. These comprise a third plurality of struts and are disposed as shown to have the apex of their V at the inner wall 14 and may be connected at one end by means of a pivot 36 to minimize or avoid the transmission of moment loads to struts 34. It will be seen that the apex of the V is thus downstream of the stator vanes 19 and, as shown in FIGURE 1, is also downstream of the annular entrance to duct 17. In order to properly transmit compression and tension loads from the cowling, the V-struts are, as shown in FIGURE 3, connected in radial alignment with an outer strut 30 or 33 to transmit the vane loads to the strut 34 substantially at a point load area and to avoid unnecessary moments on ring 20.

Thus, the arrangement of the vanes 19 in two parts 30 and 32 in conjunction with the mid-ring 20 whereby the vanes act as detachable structural members and cooperate with the large section modulus ring to avoid twisting and which, in turn, cooperate with V-struts 34 braced or slanted in the manner shown provides the maximum amount of rigidity in the transmission of the various loads to which the outer cowling 16 is subjected. In addition, where a front fan, as illustrated, is used the structure also supports the rotating fan. While the inner end of struts 34 may be pivoted, the other ends preferably are formed with a base portion 38 which may be conveniently connected to a wide cooperating base in the form of the downstream flange of the I-beam to direct the load line to a point generally midway of the ring and in alignment with the outer strut vane as seen in FIGURE 3. Any suitable and easily detachable means such as bolts 40 may be used to connect the struts to the flange.

The combination of bolting the outer vanes, inner vanes, and mid-ring together as shown in conjunction with the particular V-strut configuration and placement provides the maximum rigidity to the entire load transmission structure and deflections of the outer casing or cowling with respect to the inner wall are kept very small. The detachable arrangement provides for ease of replacement and maintainability.

While there has been described a preferred form of the invention, obviously modifications and variations are possible in light of the above teachings. It is therefore to be understood that within the scope of the appended claims, the invention may be practiced otherwise than as specifically described.

We claim:

1. In a jet propulsion powerplant of the fan type having an inner wall, a fan concentric therewith and extending radially beyond said wall, a cowling surrounding said fan and spaced from said wall to define a bypass duct therewith, gas generator means within said wall and having an annular entrance from said duct, supporting and load transmitting structure for said cowling comprising,
   a ring-like member concentrically disposed in said duct,
   a first plurality of strut stator vanes connected to said cowling and ring member,
   a second plurality of strut stator vanes connected to said ring member and to said wall radially inward of said first vanes, and
   a plurality of V-struts each leg connected to said ring radially in line with a strut of said first plurality downstream of said vanes and to said wall,
   said V-struts having their apexes connected to said wall and their opposite ends peripherally spaced on said ring upstream of said apexes whereby the cowling loads are split through said struts to the wall.

2. Apparatus as described in claim 1 wherein said first and second pluralities of struts are substantially radial across said duct and said V-strut apexes are connected to said wall downstream of said annular entrance.

3. Apparatus as described in claim 2 wherein said ring member is substantially mid-way of said duct and is continuous.

4. Apparatus as described in claim 2 wherein each strut of said second plurality extends in radial alignment with each strut of said first plurality.

5. Apparatus as described in claim 2 wherein said ring is an I-beam with its web extending axially in said duct and said V-struts opposite ends are connected to the downstream flange of said beam.

6. Apparatus as described in claim 2 wherein all said struts are removably connected to said ring, wall, and cowling, and said V-struts have a pivotal connection on at least one end thereof.

References Cited

UNITED STATES PATENTS 3,070,285    12/1962    Oldfield    230—116
3,262,270    7/1966    Beavers    60—226

MARTIN P. SCHWADRON, *Primary Examiner.*

D. HART, *Assistant Examiner.*